Nov. 1, 1932.   W. H. YANDELL   1,885,976
CONNECTING ROD
Filed Oct. 25, 1929

W. H. YANDELL   INVENTOR.

BY
Merrill M. Blackburn
ATTORNEY.

Patented Nov. 1, 1932

1,885,976

UNITED STATES PATENT OFFICE

WILLIAM H. YANDELL, OF DAVENPORT, IOWA

CONNECTING ROD

Application filed October 25, 1929. Serial No. 402,410.

In the manufacture of certain articles, it is desirable to have connecting rods which are cheap in construction, easily made, and yet strong enough to stand the strains put upon them. As an illustration of such a construction, I mention the connecting rods of certain types of pumps, though it would be possible to use this construction in connection with engines. Since other uses might be found for this device, I do not desire to be limited to any particular use.

Among the objects of this invention are to provide a connecting rod which is easily fabricated and yet durable in use; to provide a connecting rod which is of cheap and yet lasting construction; to provide a connecting rod of such construction that the main part of the work of constructing same may be done on a punch press; and such further objects, advantages and capabilities, as are inherent in the construction disclosed herein and as will later appear. My invention further resides in the combination, construction and arrangement of parts illustrated in the accompanying drawing and, while I have shown therein what is now considered the preferred embodiment of my construction, I desire the same to be understood as illustrative only and not to be construed in a limiting sense.

Figure 1:
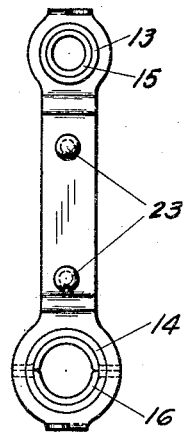
Figure 2:
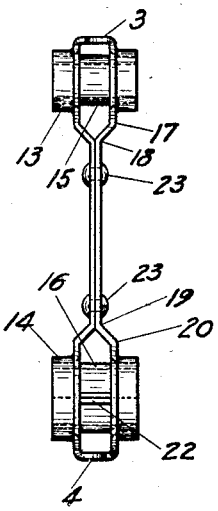
Figure 3:
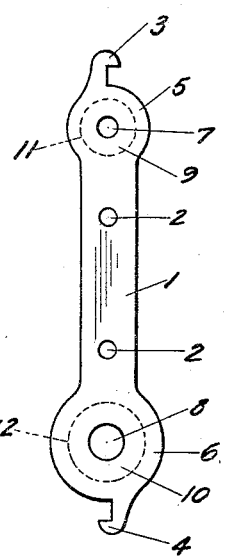
Figure 4:
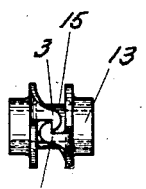
Figure 5:
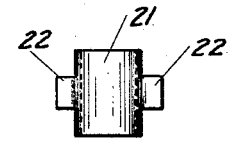
Figure 6:
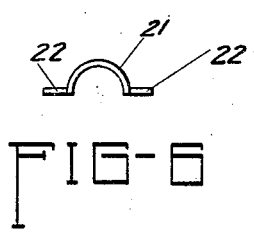
Figure 7:

In the drawing annexed hereto and forming a part hereof, Fig. 1 shows a side view of a connecting rod constructed in accordance with my present invention; Fig. 2 is an edge view of the construction shown in Fig. 1; Fig. 3 is a face view of a blank for use in the manufacture of this connecting rod; Fig. 4 is an end view of the construction shown in Figs. 1 and 2; Figs. 5 and 6 are plan and end views, respectively, of a part of a bushing used at one end of this connecting rod; Fig. 7 is an elevation of a bushing or bearing forming a part of the connecting rod.

Referring more in detail to the annexed drawing, numeral 1 denotes a blank to be used in the making of a connecting rod in accordance with the present invention. This blank is provided intermediate its ends with openings 2 whereby two such elements may be secured together by passing rivets therethrough and then riveting them in place. At its two ends, this blank is provided with hooks 3 and 4 which cooperate with similar hooks upon another blank in the locking of the two ends of adjacent elements of the connecting rod together. Between the holes 2 and the hooks 3 and 4 are enlargements 5 and 6 which are perforated as indicated at 7 and 8. The portions 9 and 10 between the perforations 7 and 8 and the dotted lines 11 and 12 are pressed outwardly to form flanges 13 and 14 about the openings 7 and 8. It will be realized that in pressing this metal through the openings are made larger. Into these enlarged openings are fitted the bushings 15 and 16, the latter of which is made up of two elements such as shown in Figs. 5 and 6.

The blank shown in Fig. 3 is bent as indicated at 17, 18, 19 and 20 so that the ends are offset laterally to form a suitable support for the bushings 15 and 16. Another method and one which I prefer to use is to have the ends of the bushings slightly reduced in diameter and have these ends pressed tightly into the openings within the flanges 13. The two ends of bushing 15 have a slight taper so that when pressed into the openings 7 they will fit tightly and be held in place. The sleeves or bushings 15 are therefore held against both rotational and longitudinal movement. The body of the connecting rod is preferably formed from sheet steel while the bushings or sleeves are preferably formed from brass or bronze. The bushings 16 are made up from two elongated semi-cylindrical body members 21 having each a pair of flat ears 22 which are received between the heads 6 and hold them spaced apart. Ordinarily, these heads would have no tendency to approach each other during use as the device is not put under sufficient strain to cause any bending thereof. The primary function, therefore, for these ears is to hold the bushings 16 from working out of the perforations within which they are located. After the formed blanks and bushings have been assembled, the rivets 23 are put in place and riveted to hold the device assembled and the hooks 3 and 4 are bent into position to reinforce the ends of the connecting rod. The hooks 3 and 4 may be used or not as desired. Ordinarily, these will not be required except in cases where the connecting rods are to operate against high pressures, such as in pumps for producing pressures of 75 lbs. per sq. inch or upward. For pressures of 25 to 50 lbs., the hooks will be entirely unnecessary.

It will of course be understood that the specific description of structure set forth above may be departed from without departing from the spirit of my invention as set forth in this specification and the appended claims.

Having now described my invention, I claim:

1. A pump connecting rod comprising a pair of body elements, a pair of bushings, and securing means to hold the parts in assembled relation, the body elements being formed from sheet metal and having their extremities separated a substantial distance for the reception of the bushings, means securing the intermediate portions of the body elements together each body element being a unitary piece perforated adjacent each of its two ends, the bushings passing through the respectively opposed openings in the body elements, the bushings having projecting portions extending between the ends of the body elements to hold them spaced apart, and the whole being held assembled by reason of the securing means holding the two body elements fastened together.

2. A connecting rod having a pair of substantially identically shaped body members each provided at each end with a bent hook, means connecting together the intermediate portions of the two body members, said members having their respective ends separated for the reception of bearing elements between them, the respective ends of the body elements being perforated for the reception of the end portions of the bearing elements, the bearing elements extending through the respectively opposite perforations in the ends of the body elements, the hooks on the ends of each body element being in cooperative interengagement with the corresponding hooks on the other body element so as to tie the adjacent ends of the body elements together.

3. A connecting rod comprising a pair of body elements secured face to face in their middle portions and having their ends spaced apart and each formed with a flanged opening, a unitary bushing tightly secured in the openings of one pair of ends, a pair of substantially semi-cylindrical bushing elements secured in the other pair of openings, said bushing elements having ears located between the ends of the body elements.

4. A structure as defined by claim 3 having hooks upon the ends of the body elements and having the hooks interengaged to lock the ends of the body elements against separation.

In witness whereof, I hereunto subscribe my name to this specification.

WILLIAM H. YANDELL.